United States Patent [19]
Vlaanderen

[11] Patent Number: 5,108,247
[45] Date of Patent: Apr. 28, 1992

[54] LOADING LINKAGE

[75] Inventor: James Vlaanderen, Kleeme, Iowa

[73] Assignee: Stellar Industries, Garner, Iowa

[21] Appl. No.: 559,184

[22] Filed: Jul. 27, 1990

[51] Int. Cl.$^5$ .............................................. B60P 1/64
[52] U.S. Cl. .................................. 414/421; 414/498; 414/546
[58] Field of Search ............... 414/498, 546, 555, 556, 414/421, 491

[56] References Cited

U.S. PATENT DOCUMENTS

| | | | |
|---|---|---|---|
| 3,942,664 | 3/1976 | Lemaire | 414/498 X |
| 4,147,266 | 4/1979 | Corompt | 414/498 X |
| 4,175,904 | 11/1979 | Airaksinen | 414/421 |
| 4,204,793 | 5/1980 | Lemaire | 414/546 X |
| 4,290,726 | 9/1981 | Sutela et al. | 414/498 X |
| 4,453,878 | 6/1984 | Paukku | 414/498 X |

FOREIGN PATENT DOCUMENTS 202944  9/1986  Japan .................. 414/546

Primary Examiner—David A. Bucci
Attorney, Agent, or Firm—Wood, Phillips, VanSanten, Hoffman & Ertel

[57] ABSTRACT

Failure difficulties due to high stress conditions in truck loading mechanisms are avoided in a construction including a tilt link (44) pivoted to a secondary link (46) which extends under and up the front of the dumpster (20) located on a truck. A dump link (50) is located under the dumpster (20) and is pivoted to the truck frame (14). A first extendable motor (82) is provided for tilting the secondary link (46) relative to the truck frame (14) and a second extendable motor (74) is provided for pivoting the tilt link (44) relative to the secondary link (46). The tilt link (44) has a tab (106) underlying a tab (94) on the dump link (50) so that when the tabs (94, 106) are engaged, the entire linkage (16) may be operated in a dump mode and when the tabs (94, 106) are disengaged, the secondary link (46) and the tilt link (44) may be moved in an on or off loading mode.

16 Claims, 1 Drawing Sheet

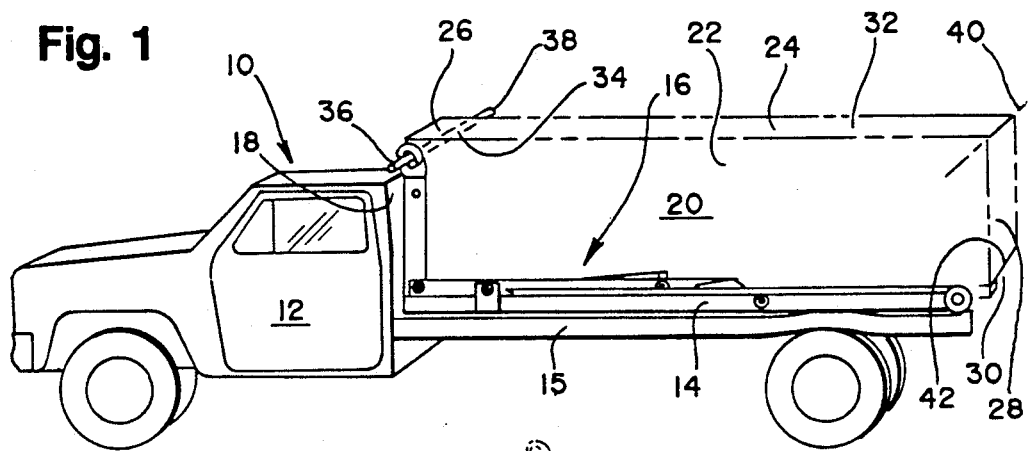
Fig. 1
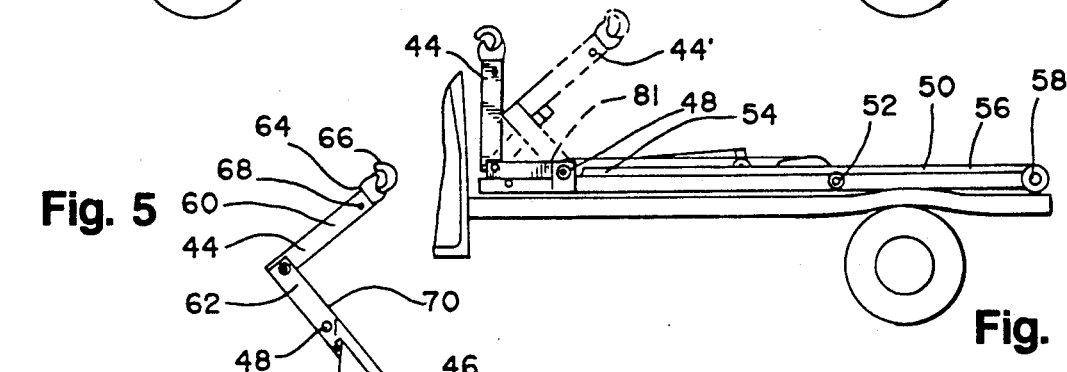
Fig. 2
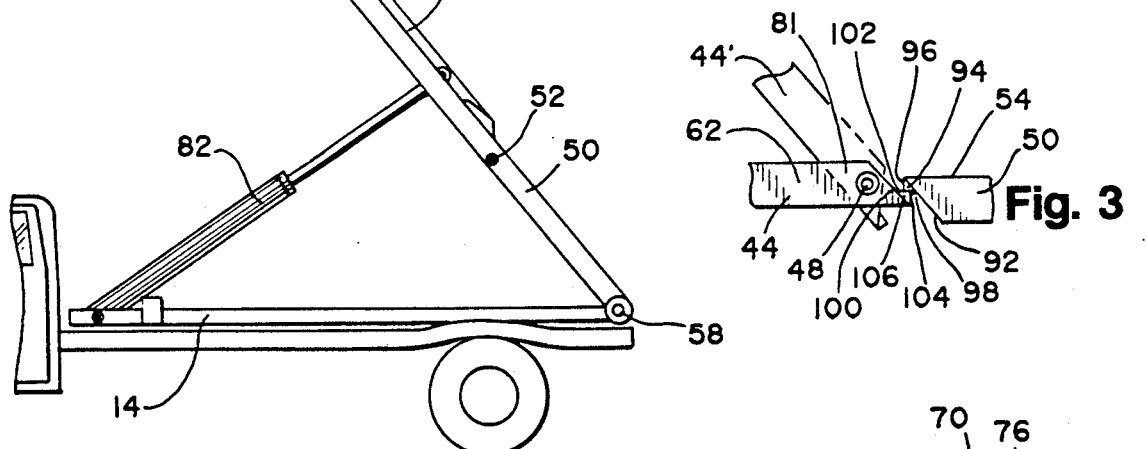
Fig. 5
Fig. 3
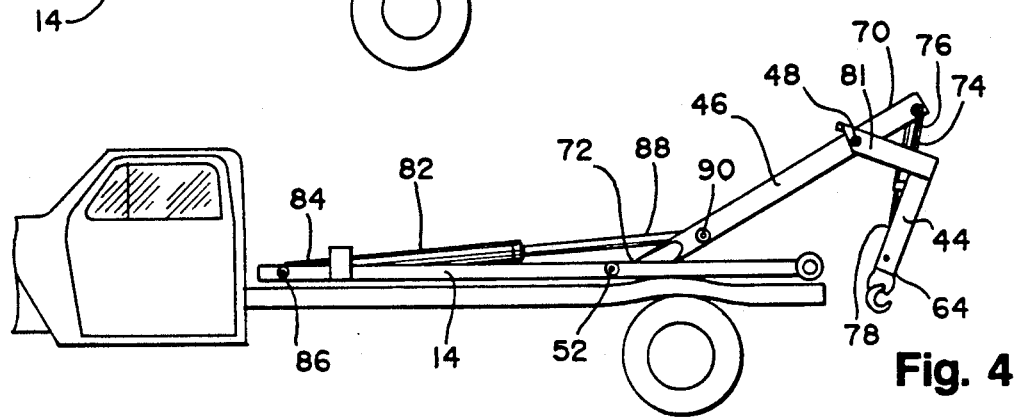
Fig. 4

LOADING LINKAGE

FIELD OF THE INVENTION

The present invention is directed toward a mechanical linkage, and more particularly, toward a linkage providing on-off loading and dumping modes for a body supported on the frame of a dumpster hauling truck.

BACKGROUND OF THE INVENTION

There are various forms of truck loading mechanisms known in the art. Most loaders currently manufactured have the capability to either load and unload a cargo receiving body from a truck or act as a dump truck and elevate a loaded body secured on a truck to dump the cargo carried within the body. A dumping capability is typically provided by locking the body to a dump section of the loading mechanism with a number of hooks mounted on the dump section which, in turn, engage with mating slots on the body. This type of apparatus results in high stress concentrations on the hooks Numerous alternative loading devices have evolved but require a complex arrangement of spring loaded latches and a plethora of moving parts. These devices are costly, prone to periodic failure, and difficult to repair.

The present invention is directed toward overcoming one or more of the problems set forth above.

SUMMARY OF THE INVENTION

The present invention comprehends a linkage providing on-off loading and dumping modes for installation on the frame of a dumpster hauling truck the linkage has a secondary link and a tilt link pivoted to the frame and extending under and up the front of a dumpster on the truck. A dump link is also provided and extends under the dumpster and is pivoted to the rear of the truck frame. A first power cylinder pivotally engages the secondary link for tilting the secondary link relative to the truck frame. A second power cylinder is provided for pivoting the tilt link relative to the secondary link. The tilt link has a portion underlying the dump link in one position to lock all the links for movement in unison under power from the first power cylinder to effectuate the dumping mode.

The tilt link may be tilted relative to the secondary link under the power of the second power cylinder to remove the portion underlying the dump link and disconnect the dump links from the remaining links, thus allowing movement of the tilt and secondary links without movement of the dump link under power from the first power cylinder to effectuate the on-off loading mode.

In one form of the invention, the first power cylinder has a pair of telescoping ends and is attached at one end to the secondary link and is attached at another end to the truck frame. Each of the telescoping ends have pivotal connections engaging the secondary link and the truck frame whereby the secondary link may be rotated relative to the truck frame.

In another form, the second power cylinder has a pair of telescoping ends and is attached at one end to the tilt link and is attached at another end to the secondary link. Each of the telescoping ends have pivotal connections engaging the tilt link and the secondary link whereby the tilt link may be rotated relative to the secondary link.

Other objects and advantages will become apparent from the following specification taken in connection with the accompanying drawings.

DESCRIPTION OF THE DRAWINGS

FIG. 1 is a perspective view a dumpster hauling truck having a loading linkage embodying the features of the present invention;

FIG. 2 is a fragmentary side elevation of the truck shown in FIG. 1 with a tilt link in dotted lines rotated to an on-off loading mode;

FIG. 3 is an enlarged, fragmentary view of the locking portions on the tilt link and a dump link of the loading linkage shown in FIG. 1;

FIG. 4 is a fragmentary side elevation of the truck with the tilt link and a secondary link rotated in an on-off loading mode; and FIG. 5 is a fragmentary side elevation of the truck with the tilt link and the secondary link and the dump link rotated in unison in a dumping mode.

DESCRIPTION OF THE PREFERRED EMBODIMENT

FIG. 1 illustrates a truck generally at 10 having a forward portion or cab 12 and a rearwardly extending bed or frame 14 supported on frame rails 15, only one of which is shown. A linkage embodying the features of the present invention is shown generally at 16 and is supported on the frame 14 and in proximity to a rear face 18 of the cab 12 to carry a rectangular dumpster or load receiving body shown in phantom lines at 20. The dumpster 20 has a pair of laterally spaced sidewalls 22 and 24 extending between opposite end walls 26 and 28. A bottom wall 30 is supported on the linkage 16 and is opposite an open top 32. A grab bar 34 is mounted on the front wall 26 of dumpster 20 and has a pair of oppositely spaced laterally extending ends 36 and 38 which may be engaged with the linkage 16.

The rear wall 28, in one mode, is defined by a pivoting door having a hinge shown schematically at 40 and a locking pin shown schematically at 42 for securing the door.

It should be understood that while a single linkage 16 is illustrated in the views of FIGS. 1 and 2, the present invention comprehends an apparatus having a pair of identical linkages laterally spaced on the truck frame 14 and each associated with one of the longitudinally extending frame rails 15 typically mounted on the underside of a truck frame for supporting a load thereon. With that understanding, the following discussion will describe the single linkage illustrated in FIG. 1 only.

The linkage 16 includes an L-shaped tilt link 44 pivotally connected to a secondary link 46 near one end thereof by a pivot pin 48. A third link, or dump link 50 has one end pivotally connected to the secondary link 46 oppositely of the tilt link 44 by a pivot pin 52. As illustrated in FIG. 2, the dump link 50 extends from a first end 54 adjacent the tilt link 44 along the frame 14 to the rear of the truck to an opposite end 56 which is joined to the frame 14 with a pivot connection 58.

The tilt link 44 has mutually perpendicular legs 60 and 62. The leg 60 has an outer end 64 terminating in a hook 66 which is rigidly attached to the leg 60 at a pin 68. The hook 66 is engageable with a respective one of the ends 36, 38 of the grab bar 34.

The secondary link 46 is an elongate rigid member having opposed ends 70 and 72. The end 72 includes the pivot 52 which joins the secondary link 46 with the dump link 50 intermediate the ends of the latter. An extendible hydraulic cylinder 74 has its cylinder end 76 pivotally connected to the end 70 of the secondary link 46 and its rod end 78 pivotally connected to the outer end 64 of the tilt link 44 by the pin 68. Thus, the hydraulic cylinder 74 is operable to rotate the tilt link 44 relative to the secondary link 46 between the solid and dotted line positions shown in FIG. 2.

The dump link 50 extends from the pivot 58 at the rear most end 80 of the frame 14 forwardly to its end 54 which is in close proximity to the end 81 of the leg 62 of the tilt link 44.

A second power cylinder 82 has its cylinder end 84 pivotally connected by means of a pivot 86 to the frame 14 oppositely of the pivot 58. The rod end 88 of the cylinder 82 is connected at an opposite end 88 by means of pivot 90 to the secondary link 46 intermediate its ends 70 and 72.

As best shown in the enlarged view of FIG. 3, the end 54 of the dump link 50 has an angled section 92 from which a tab 94 having perpendicular surfaces 96 and 98 extends. The leg 62 has a complementary arrangement with an angled section 100 and perpendicular faces 102 and 104 on a tab 106 which extend into underlying relation with the tab 94. Thus, the surface 98 on the tab 94 of the dump link 50 and the surface 104 of the tab 106 on the leg 62 of the tilt link 44 serve as stops and may engage to limit clockwise rotation of the secondary link 46 relative to the dump link about the pivot pin 52. However, when the tilt link 44 is rotated in a clockwise direction relative to both the dump link 50 and the secondary link 46 as seen in FIG. 3, the tabs 94 and 106 disengage. When this occurs, the cylinder 82 may be operated to pivot the secondary link 46 on the dump link 50 without moving the latter on the frame 14.

In one mode of operation, the linkage 16 is adapted for providing on and off loading of a typically constructed refuse receiving dumpster 20.

Prior to entering the on-off loading mode, each of the links 44, 46 and 50 will typically be positioned as shown in solid lines in FIG. 2 such that the linkage forms a generally L-shaped structure extending along the length of the frame 14 and up the rear face 18 of the cab 12. Each of the hydraulic cylinders 74 and 82 initially will be in a retracted position. The power cylinder 74 is then extended by any suitable control (not shown) to move the tilt link 44 relative to secondary link 46 and the dump link 50 to the dotted line position shown in FIGS. 2 and 3. This rotation results in disengagement of the tab 106 on the tilt link 44 and the tab 94 on the dump link 50. The power cylinder 82 is then actuated and operates to rotate the secondary link 46 about the pivot 52 as shown in FIG. 4. Because the tilt link 44 and the dump link 50 are disengaged, the tilt link 44 will move with the secondary link 46 while the dump link 50 will remain stationary on the frame 14. The power cylinder 82 is continuously extended to rotate the secondary link 46 and tilt link 44 into position for receiving the grab bar 34 of a dumpster 24 positioned on the ground or depositing a dumpster. For on loading, once the hook 66 is aligned with the grab bar 34, the power cylinder 82 is retracted to rotate the secondary link 46 in a counter clockwise direction as viewed in FIG. 5 to fully engage the hook 66 with the dumpster 20. Continued rotation of the secondary link 46 results in the raising of dumpster 20 onto the truck 10. Once the secondary link 46 is rotated back into its initial position, the power cylinder 74 is retracted to rotate tilt link 44 about pivot 48 to pull the dumpster forward on the linkage 16 to the position shown in FIG. 1 to be ready for transport Rollers (not shown) may be conventionally employed to allow ready movement of the dumpster 20 on the truck 10.

To off load the dumpster 20, the above process is simply reversed.

In the dumping mode of operation, the links 44, 46 and 50 are rotated in unison as a rigid structure under power from the power cylinder 82 to elevate a dumpster 20 carried on the frame 14 to an angle sufficient to permit the discharge of material carried within the body through the end wall/door 28 under the force of gravity.

In this mode, the dumpster 20 is elevated and tilted with the linkage 16 in the following manner. With the links 44,46 and 50 in the configuration shown in FIG. 1 with the tabs 94 and 106 of the tilt link 44 and the dump link 50 engaged, the power cylinder 82 is actuated by any suitable control (not shown). At the same time, the cylinder 74 is locked in its retracted position as by a conventional hydraulic lock in its actuating circuit. As the power cylinder 82 is extended, the rod end 88 exerts an elevating force against the secondary link 46. Due to the pivotal connection 48 between the tilt link 44 and the secondary link 46, and the cylinder 74 being locked in a retracted configuration, the tabs 94 and 106 are engaged to transmit the elevating force to the dump link 50. As a result, the links 44, 46 and 50 move in unison about the pivot 58 on the rear of the truck frame to the position shown in FIG. 5.

Once the linkage 16 is raised to an angle sufficient to allow the gravity-induced discharge of materials contained within the dumpster 20, or prior thereto as desired, the lock pin 42 is withdrawn to permit the rotation of the end wall/door 28 about the hinge axis 40 to permit the egress of materials therethrough. Thereafter, the cylinder 82 may be retracted to lower the linkage to the transport position shown in solid lines in FIG. 2.

This arrangement of interconnected links and power cylinders provides a novel multi-function truck load-/unloading/dumping linkage with a minimal number of moving parts and with an extremely cost effective construction

I claim:

1. In a truck frame of a dumpster hauling truck, a linkage providing on-off loading and dumping modes, comprising:
    a dump link extending under a dumpster on the truck and pivoted to the truck frame;
    a secondary link pivoted to the dump link;
    a tilt link pivoted to the secondary link to extend under and up the front of the dumpster;
    a first extendable motor for tiling the secondary link relative to the truck frame; and
    a second extendable motor for pivoting the tilt link relative to the secondary link,
    said tilt link having a portion engageable with the dump link in one position of said tilt link to connect all the links for movement in unison under power from the first extendable motor to effectuate the dumping mode.

2. The linkage of claim 1 wherein said first and second extendable motors are first and second power cylinders.

3. The linkage according to claim 2 in which the first power cylinder has a pair of spaced apart ends, one of the ends being a telescoping end attached to the secondary link and the other end attached to the truck frame.

4. The linkage according to claim 3 in which each of the spaced apart ends have pivotal connections engaging the secondary link and the truck frame whereby the secondary link may be rotated relative to the truck frame under the power of the first power cylinder.

5. The linkage according to claim 2 in which the second power cylinder has a pair of spaced apart ends, one of the ends being a telescoping end attached to the tilt link and the other end attached to the secondary link.

6. The linkage according to claim 5 in which each of the spaced apart ends have pivotal connections engaging the tilt link and the secondary link whereby the tilt link may be rotated relative to the secondary link under the power of the second power cylinder.

7. In a truck frame of a dumpster hauling truck, a linkage providing on-off loading and dumping modes, comprising:
an elongate dump link extending under a dumpster on the truck and pivoted to the truck frame;
a pair of interconnected links pivoted to the dump link;
a first power cylinder for tilting the interconnected links and the dump link relative to the truck frame;
a second power cylinder for tilting the interconnected links relative to each other to effectuate the on-off loading mode; and
lock means intermediate the interconnected links and the dump link for locking all the links together for movement in unison under power from the first power cylinder in the dumping mode, the lock means being operable to allow unlocking of the dump link from the interconnected links for pivotal movement relative thereto in the on-off loading mode solely upon activation of the second power cylinder prior to activation of the first power cylinder.

8. The linkage according to claim 7 in which the interconnected links extend under and up the front of the dumpster on the truck.

9. The linkage according to claim 7 in which the dump link is pivoted to the rear of the truck frame.

10. The linkage according to claim 7 in which the dump link is pivoted to one of the interconnected links.

11. The linkage of claim 10 in which the interconnected links have an interposed pivot rotatably joining the links, with the pivot connecting dump link to one of the interconnected links being intermediate the interposed pivot and the rear of the truck frame.

12. The linkage according to claim 7 in which the lock means comprises a pair of engageable tabs, one of the tabs extending from an end of one of the interconnected links and underlying a complementary tab extending from an adjacent end of the dump link.

13. A multi-function linkage in a truck frame for providing on-off loading and dumping of a load-receiving body carried on the truck frame, comprising:
a dump link under the load-receiving body and pivoted on the truck frame;
a pair of interconnected links extending about the load receiving body and pivoted to the dump link;
first actuation means for tilting the interconnected links and the dump link relative to the truck frame and for alternatively tilting only the interconnected links relative to the truck frame;
second actuation means for rotating the interconnected links relative to each other; and
engagement means on the dump link for engaging the interconnected links and connecting all of the links for movement in unison under power from the first actuation means in the dumping mode, the engagement means comprising an end portion of the dump link which overlaps a complementary end portion of one of the interconnected links, whereby upon rotation of the interconnected links relative to each other under power from the second actuation means, the interconnected links are movable relative to the dump link under power from the first actuation means.

14. The linkage according to claim 13 in which the first actuation means comprises is a power cylinder pivoted to the truck frame and engaging one of the interconnected links.

15. The linkage according to claim 13 in which the second actuation mean comprises a power cylinder intermediate the pair of interconnected links.

16. In a truck frame for a dumpster hauling truck, the combination of:
a dump link pivoted at one end to said frame;
an L-shaped tilt link;
a secondary link;
a first pivot connecting said tilt link and said secondary link;
a first hydraulic cylinder extending between said tilt link and said secondary link for effecting pivotal movement therebetween;
a second pivot remote from said first pivot and intermediate the ends of said dump link pivotally connecting said secondary link and said dump link; and
a second hydraulic cylinder extending between said frame and said secondary link;
adjacent sections of said tilt link and said dump link being in interference relation for at least one position of movement of said tilt link to lock said tilt link, said secondary link and said dump link together for movement in unison to provide a dumping mode of operation;
said first cylinder being operable to move said tilt link from said at least one position to another position whereat said adjacent sections are not in interference relation thereby freeing said tilt link and said secondary link for pivotal movement relative to said dump link to provide an on-off loading mode of operation.

* * * * *